2,767,191

DIHYDROPYRROLO-PYRIDINES

William B. Wright, Jr., Plainfield, N. J., assignor to American Cyanamid Company, New York, N. Y., a corporation of Maine No Drawing. Application December 31, 1953, Serial No. 401,724

7 Claims. (Cl. 260—295)

This invention relates to new organic compounds. More particularly, it relates to 2,3-dihydro-6-methyl-1H-pyrrolo[3,4-c]-pyridines and salts thereof.

In the past numerous derivatives of pyridine have been prepared. The chemical literature, however, does not disclose any 2,3-dihydropyrrolo[3,4-c]pyridine condensed ring compounds having substituents on the rings. The new compounds of the present invention have been found to have analgesic, vaso-dilator, anticonvulsant and fungicidal activity.

The compounds of the present invention may be illustrated by the following general formula:

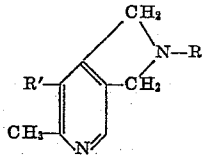

in which R is hydrogen or a lower alkyl, carbalkoxy, acyl, aroyl or benzenesulfonyl radical, R' is a halogen, hydroxy, alkoxy, amino or substituted amino radical, salts and quaternary salts thereof.

In general, the bases are soluble in alcohol, usually relatively insoluble in ether and may be water soluble, depending upon molecular size and constituents. The hydrochloride salts are generally water soluble but reprecipitated by excess hydrochloric acid or alcohol. Most are essentially alcohol insoluble. The salts may usually be recrystallized from aqueous alcohol mixtures. The solubility of both the salts and the bases is low in many organic solvents including ether.

The preparation of these compounds is dependent upon the particular compound desired. For example, 7-amino-2,3-dihydro-6-methyl-1H-pyrrolo[3,4-c]pyridine is prepared from the gamma-lactam of 3-amino-5-aminomethyl-2-methylpyridine-4-carboxylic acid by a lithium aluminum hydride reduction. Having obtained the above compound, the derivatives thereof in which R of the general formula is benzoyl or carbethoxy can be obtained by reaction with the corresponding acid chloride under alkaline conditions. When R contains the above radicals and R' is an amino group the compounds can be converted through the diazo derivatives to a variety of compounds substituted in the 7-position by, for example, hydroxy, alkoxyl, mercapto or halogen atoms. Removal of the radical R by acid or alkaline hydrolysis liberates a new group of compounds of the present invention.

In preparing the compounds wherein R and R' are acyl and acylamino respectively, 7-amino-2,3-dihydro-6-methyl-1H-pyrrolo-[3,4-c]pyridine is reacted with an alkanoic acid anhydride. These compounds can be converted into the corresponding alkyl compounds by reduction of the acyl groups with lithium aluminum hydride.

The compounds of the present invention, as illustrated by the general formula, can be those in which R is hydrogen, methyl, ethyl, propyl, butyl, carbomethoxy, carbethoxy, carbopropoxy, carbobutoxy, acetyl, propionyl, butyryl, benzoyl, naphthoyl, p-aminobenzenesulfonyl, m-aminobenzenesulfonyl, and the like. The radical R' can be hydroxyl, methoxy, ethoxy, propoxy, butoxy, amino, acetylamino, propionylamino, butyrylamino, methylamino, ethylamino, propylamino, dimethylamino, diethylamino, dipropylamino, dibutylamino, and the like.

The preparation of representative dihydropyrrolo-[3,4-c]pyridine compounds of the present invention is described in the following examples. Temperatures are expressed in degree centigrade.

EXAMPLE 1

*7-amino-2,3-dihydro-6-methyl-1H-pyrrolo[3,4-c]
pyridine*

A solution of one part of the gamma-lactam of 3-amino-5-aminoethyl-2-methylpyridine-4-carboxylic acid in 200 parts by volume of tetrahydrofuran is added over a 30-minute period at 45°–50° to a solution of 2 parts of lithium aluminum hydride in 100 parts by volume of tetrahydrofuran. The reaction is heated at 60°–65° for 7 hours and then excess lithium aluminum hydride and complex salts are decomposed by the addition of 4 parts of water in 15 parts by volume of tetrahydrofuran. The reaction is filtered at 60° and the cake washed with a little ethanol. The filtrate is acidified with concentrated hydrochloric acid and on standing deposits 0.77 part of a brown powder. When this material is dissolved in water, clarified and treated with concentrated hydrochloric acid, 7-amino-2,3-dihydro-6-methyl-1H-pyrrolo-[3,4-c]pyridine dihydrochloride precipitates as an almost white powder.

The free base, melting at 167–9° C., is obtained by treating the dihydrochloride with alcoholic sodium methylate, filtering off the salt and concentrating the filtrate.

EXAMPLE 2

*7-amino-2-benzoyl-2,3-dihydro-6-methyl-1H-
pyrrolo[3,4-c]pyridine*

Benzoyl chloride, 165 parts, is added over a 40-minute period at 30°–35° to a mixture of 280 parts of 7-amino-2,3-dihydro-6-methyl-1H-pyrrolo[3,4-c]pyridine dihydrochloride and 150 parts of sodium hydroxide in 2400 parts of water. The reaction is stirred for two hours longer at 30°–35° and then filtered and washed with water. After drying in the oven it is recrystallized from ethanol and 7-amino-2-benzoyl-2,3-dihydro-6-methyl-1H-pyrrolo-[3,4-c]pyridine, melting at 202–3° is obtained in 61% yield.

EXAMPLE 3

*7-amino-2-carbethoxy-2,3-dihydro-6-methyl-1H-
pyrrolo[3,4-c]pyridine*

5 N Sodium hydroxide, 400 parts, and 194 parts by volume of ethyl chloroformate are added simultaneously to a solution of 448 parts of 7-amino-2,3-dihydro-6-methyl-1H-pyrrolo[3,4-c]pyridine dihydrochloride, 1500 parts of water and 800 parts by volume of 5 N sodium hydroxide. The reaction is held at 10°–20° during this addition and water is added as required to thin the thick slurry which forms. The reaction is stirred for one and one-half hours and the product is then filtered and washed with water. The wet cake is dissolved in a minimum of boiling alcohol, treated with activated charcoal and cooled. 7-amino-2-carbethoxy-2,3-dihydro-6-methyl-1H - pyrrolo-[3,4-c]pyridine is obtained in 65% yield as a monohydrate melting at 182–3° C.

EXAMPLE 4

*7-acetamido-2-acetyl-2,3-dihydro-6-methyl-1H-
pyrrolo[3,4-c]pyridine*

Acetic anhydride, 300 parts by volume, is heated to 80° and 97 parts of 7-amino-2,3-dihydro-6-methyl-1H-pyrrolo[3,4-c]pyridine base is added in portions. After the exothermic reaction subsides the mixture is heated on the steam bath for one and one-half hours longer and then concentrated to dryness. The product is recrystallized from ethanol. The yield of pure 7-acetamido-2-acetyl-2,3-dihydro-6-methyl-1H - pyrrolo[3,4 - c]pyridine, melting at 225–7° C., is 73%.

EXAMPLE 5

*2,3-dihydro-2-ethyl-7-ethylamino-6-methyl-1H-pyrrolo[3,4-c]pyridine dihydrochloride*

A suspension of two parts of 7-acetamido-2-acetyl-2,3-dihydro-6-methyl-1H-pyrrolo[3,4-c]pyridine in 280 parts by volume of hot tetrahydrofuran is added over a 30-minute period at 45°–50° to a solution of three parts of lithium aluminum hydride in 100 parts by volume of tetrahydrofuran. The reaction is heated at reflux for seven hours and then allowed to stand at room temperature overnight. Six parts of water are added and the mixture is filtered hot and washed with a little ethanol. The filtrate is acidified with concentrated hydrochloric acid and the white precipitate is filtered. On recrystallization from alcohol, pure 2,3-dihydro-2-ethyl-7-ethylamino - 6 - methyl - 1H-pyrrolo[3,4-c]pyridine dihydrochloride is obtained.

EXAMPLE 6

*2-benzoyl-2,3-dihydro-7-hydroxy-6-methyl-1H-pyrrolo[3,4-c]pyridine hydrochloride*

A solution of 21 parts of sodium nitrite in 100 parts of water is added over a 30-minute period at 2°–4° to a mixture of 76 parts of 7-amino-2-benzoyl-2,3-dihydro-6-methyl-1H-pyrrolo[3,4-c]pyridine dihydrochloride, 3500 parts of water and 240 parts by volume of 5N hydrochloric acid. The reaction is gradually warmed over a two hour period to 28° and then 80 parts by volume of 5N sodium hydroxide is added. The reaction is concentrated under reduced pressure, filtered and washed with acetone. On recrystallization from ethanol, 2-benzoyl-2,3-dihydro-7-hydroxy-6 - methyl - 1H - pyrrolo[3,4-c]pyridine hydrochloride, melting at 222–4° C., is obtained in 59% yield.

EXAMPLE 7

*2,3-dihydro-7-hydroxy-6-methyl-1H-pyrrolo[3,4-c]pyridine dihydrochloride*

When the compound of Example 6 is heated on the steam bath with 10 parts by volume of 5N hydrochloric acid for 3–5 hours, 2,3-dihydro-7-hydroxy-6-methyl-1H-pyrrolo[3,4-c]pyridine dihydrochloride is obtained in nearly quantitative yield.

EXAMPLE 8

*2-carbethoxy-2,3-dihydro-7-hydroxy-6-methyl-1H-pyrrolo[3,4-c]pyridine hydrochloride*

When 7-amino-2-carbethoxy-2,3-dihydro-6-methyl-1H-pyrrolo[3,4-c]pyridine is treated with sodium nitrite by essentially the same procedure as in Example 6, 2-carbethoxy-2,3-dihydro-7-hydroxy-6 - methyl - 1H - pyrrolo[3,4-c]pyridine hydrochloride, melting at 246° C., is obtained in 69% yield.

EXAMPLE 9

*2-benzoyl-2,3-dihydro-7-methoxy-6-methyl-1H-pyrrolo[3,4-c]pyridine*

A solution of 56 parts of sodium nitrite in 160 parts of water is added over a one hour period at 48°–50° C. to a mixture of 101 parts of 7-amino-2-benzoyl-2,3-dihydro-6-methyl-1H-pyrrolo[3,4-c]pyridine, 4000 parts by volume of methanol and 166 parts by volume of concentrated hydrochloric acid. The reaction is heated for one hour longer and then adjusted to a pH of about 7 with sodium carbonate. The reaction is concentrated under reduced pressure to a small volume, diluted with water and again concentrated until precipitation occurs. The precipitate is filtered, water washed, dissolved in dilute acid, treated with activated charcoal to remove color and the pH adjusted with sodium carbonate to 5.2. The product is filtered and dried. After recrystallizing first from ethanol and then from isopropyl acetate, 2-benzoyl-2,3-dihydro-7-methoxy-6 - methyl - 1H - pyrrolo[3,4-c]pyridine, melting at 149°–151° C., is obtained in 35% yield.

EXAMPLE 10

*2,3-dihydro-7-methoxy-6-methyl-1H-pyrrolo-[3,4-c]pyridine dihydrochloride*

When the compound of Example 9 is heated on the steam bath with aqueous alcoholic sodium hydroxide and then acidified, 2,3-dihydro-7-methoxy-6-methyl-1H-pyrrolo[3,4-c]pyridine dihydrochloride is obtained in 74% yield.

EXAMPLE 11

*7-methoxy-2-acetyl-2,3-dihydro-6-methyl-1H-pyrrolo[3,4-c]pyridine*

When 2,3-dihydro-7-methoxy-6-methyl - 1H - pyrrolo-[3,4-c]pyridine is heated on the steam bath for one and one-half hours with acetic anhydride, an 81% crude yield of 7-methoxy-2-acetyl-2,3-dihydro-6-methyl-1H-pyrrolo[3,4-c]pyridine is obtained. Pure material melting at 116°–117° is obtained by recrystallizing this from ethanol.

EXAMPLE 12

*7-methoxy-2-acetyl-2,3-dihydro-6-methyl-1H-pyrrolo[3,4-c]pyridine methiodide*

A mixture of 2.06 parts of 7-methoxy-2-acetyl-2,3-dihydro-6-methyl-1H-pyrrolo[3,4-c]pyridine, 1.87 parts by volume of methyl iodide, and 15 parts by volume of ethanol is allowed to stand at room temperature for five days. It is then heated at refluxing temperatures for one and one-half hours and concentrated under reduced pressure. Upon addition of ethyl ether 3.1 g. of 7-methoxy-2-acetyl-2,3 - dihydro - 6 - methyl - 1H - pyrrolo[3,4-c]-pyridine methiodide, melting at 175°–177°, is obtained.

EXAMPLE 13

*7-methoxy-2-acetyl-2,3-dihydro-6-methyl-1H-pyrrolo[3,4-c]pyridine ethiodide*

By substituting ethyl iodide for methyl iodide in the procedure of Example 12, 7-methoxy-2-acetyl-2,3-dihydro-6-methyl-1H-pyrrolo[3,4-c]pyridine ethiodide, melting at 175°, may be obtained.

EXAMPLE 14

*7-acetoxy-2-acetyl-2,3-dihydro-6-methyl-1H-pyrrolo[3,4-c]pyridine*

A mixture of 7-hydroxy-2,3-dihydro-6-methyl-1H-pyrrolo[3,4-c]pyridine and acetic anhydride is heated on the steam bath for one and one-half hours and then concentrated under reduced pressure. The product is crystallized and washed out of the flask with a little ethanol. Upon recrystallization from alcohol pure 7-acetoxy-2-acetyl - 2,3 - dihydro - 6 - methyl - 1H - pyrrolo[3,4-c]-pyridine, melting at 143–4°, is obtained.

EXAMPLE 15

*7-acetoxy-2-acetyl-2,3-dihydro-6-methyl-1H-pyrrolo[3,4-c]pyridine methiodide*

This compound melting at 222–4° is obtained by reacting 7-acetoxy-2-acetyl-2,3-dihydro-6-methyl-1H-pyrrolo[3,4-c]pyridine with methyl iodide as in Example 12.

EXAMPLE 16

*7-iodo-2-carbethoxy-2,3-dihydro-6-methyl-1H-pyrrolo [3,4-c]pyridine*

A mixture of 9.56 parts of 7-amino-2-carbethoxy-2,3-dihydro-6-methyl-1H-pyrrolo[3,4-c]pyridine, 250 parts of water and 48 parts by volume of 5N sulfuric acid is cooled to 0° C. and a solution of 2.94 parts of sodium nitrite in 10 parts of water is added. The reaction is stirred at a maximum temperature of 2° C. for ten minutes longer and a solution of 7.3 parts of potassium iodide in 20 parts of water is added. The reaction is allowed to gradually warm up to room temperature and then filtered to remove some brown insoluble material. Treatment of the filtrate with sodium bicarbonate caused crude 7-iodo-2-carbethoxy - 2,3 - dihydro-6-methyl-1H-pyrrolo[3,4-c]pyridine to separate. A pure product of melting point 133–4° is obtained by recrystallizing from ethanol.

EXAMPLE 17

*7-bromo-2-carbethoxy-2,3-dihydro-6-methyl-1H-pyrrolo [3,4-c]pyridine*

A mixture of 9.56 parts of 7-amino-2-carbethoxy-2,3-dihydro-6-methyl-1H-pyrrolo[3,4-c]pyridine, 250 parts of water and 25 parts by volume of 48% hydrogen bromide was cooled to 0° C. and a solution of 2.9 parts of sodium nitrite in 20 parts of water was added. The reaction was held at 0° to —4° for a total of 25 minutes and then poured into a solution of seven parts of cuprous bromide in 15 parts of water and 25 parts of 48% hydrogen bromide. The mixture was allowed to stand for an hour, heated to 55° C., clarified with activated charcoal and cooled. Hydrogen sulfide gas was passed in and the dark precipitate which formed was filtered. The filtrate was treated with sodium bicarbonate and 7 - bromo-2-carbethoxy-2,3-dihydro-6-methyl-1H-pyrrolo [3,4-c]pyridine precipitated. On recrystallization from ether, a pure product melting at 95–6° is obtained.

EXAMPLE 18

*2-(p-acetamidobenzenesulfonyl)2,3-dihydro-7-methoxy-6-methyl-1H-pyrrolo[3,4-c]pyridine*

A mixture of 1.19 parts of 2,3-dihydro-7-methoxy-6-methyl-1H-pyrrolo[3,4-c]pyridine dihydrochloride, 1.23 parts of p-acetamidobenzenesulfonyl chloride and 30 parts of 1N sodium hydroxide was stirred at 30°–35° for one hour and then heated on the steam bath for two hours. The precipitate was filtered, water washed and oven dried. It was then recrystallized from ethanol for pure 2 - (p - acetamidobenzenesulfonyl) - 2,3 - dihydro-7-methoxy-6-methyl-1H-pyrrolo[3,4-c]pyridine melting at 212°–213° d.

EXAMPLE 19

*2-(p-aminobenzenesulfonyl)-2,3-dihydro-7-methoxy-6-methyl-1H-pyrrolo[3,4-c]pyridine*

When the compound of Example 18 is heated on the steam bath with aqueous alcoholic sodium hydroxide, 2 - (p - aminobenzenesulfonyl)-2,3-dihydro-7-methoxy-6-methyl-1H-pyrrolo[3,4-c]pyridine is obtained.

EXAMPLE 20

*2-(p-acetamidobenzenesulfonyl)-7-amino-2,3-dihydro-6-methyl-1H-pyrrolo[3,4-c]pyridine*

A mixture of 448 parts of 7-amino-2,3-dihydro-6-methyl-1H-pyrrolo[3,4-c]pyridine dihydrochloride, 490 parts of p-acetamidobenzenesulfonyl chloride, 3500 parts of water and 256 parts of sodium hydroxide is stirred for three hours and then heated on the steam bath for one hour. The insoluble portion is filtered off, water washed, and oven dried. The crude yield is 75%. On recrystallization from 80% ethanol pure 2-(p-acetamidobenzenesulfonyl)-7-amido-2,3-dihydro - 6 - methyl - 1H-pyrrolo[3,4-c]pyridine is obtained as a half-hydrate.

EXAMPLE 21

*2-(p-acetamidobenzenesulfonyl)-7-hydroxy-2,3-dihydro-6-methyl-1H-pyrrolo[3,4-c]pyridine*

The above compound is prepared in 35% yield by treating 7-hydroxy-2,3-dihydro - 6 - methyl-1H-pyrrolo [3,4-c]pyridine with p-acetamidobenzenesulfonyl chloride in a procedure similar to that used in Example 20.

I claim:
1. Compounds of the group consisting of those having the formula

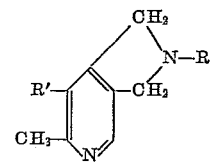

in which R is a member of the group consisting of hydrogen, lower alkyl, carbloweralkoxy, lower alkanoyl, benzoyl and benzenesulfonyl radicals, $R_1$ is a member of the group consisting of halogen, hydroxy, lower alkoxy, amino, lower alkyl amino and lower alkanoyl amino radicals and salts thereof.

2. An unsubstituted 7-amino-2-lower alkyl-2,3-dihydro-6-methyl-1H-pyrrolo[3,4-c]pyridine.

3. An unsubstituted 7-lower-alkoxy-2-benzoyl-2,3-dihydro-6-methyl-1H-pyrrolo[3,4-c]pyridine.

4. 7-amino-2,3-dihydro-6-methyl - 1H - pyrrolo[3,4-c] pyridine.

5. 7-iodo-2-carbethoxy-2,3-dihydro - 6 - methyl - 1H-pyrrolo[3,4-c]pyridine.

6. 2,3 - dihydro-7-hydroxy-6-methyl-1H-pyrrolo[3,4-c] pyridine dihydrochloride.

7. 2,3 - dihydro-7-methoxy-6-methyl-1H-pyrrolo[3,4-c] pyridine dihydrochloride.

References Cited in the file of this patent

Chem. Abst. 45:8530a.